US010065636B2

(12) United States Patent
Varnhagen et al.

(10) Patent No.: US 10,065,636 B2
(45) Date of Patent: Sep. 4, 2018

(54) VEHICLE TIRE SATURATION ESTIMATOR

(71) Applicant: Ford Global Technologies, LLC, Dearborn, MI (US)

(72) Inventors: Scott Varnhagen, Ann Arbor, MI (US); Ming Lang Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 77 days.

(21) Appl. No.: 15/190,635

(22) Filed: Jun. 23, 2016

(65) Prior Publication Data
US 2017/0369050 A1     Dec. 28, 2017

(51) Int. Cl.
| G06F 17/00 | (2006.01) |
| B60W 30/02 | (2012.01) |
| B60K 28/16 | (2006.01) |
| B60T 8/58 | (2006.01) |

(Continued)

(52) U.S. Cl.
CPC ............. *B60W 30/02* (2013.01); *B60K 28/16* (2013.01); *B60T 8/58* (2013.01); *B60W 10/06* (2013.01); *B60W 10/184* (2013.01); *B60W 2520/10* (2013.01); *B60W 2520/28* (2013.01); *B60W 2710/0677* (2013.01); *B60W 2710/182* (2013.01)

(58) Field of Classification Search
CPC .... B60W 30/02; B60W 10/06; B60W 10/184; B60W 2710/182; B60W 2710/0677; B60W 2520/10; B60W 2520/28; B60T 8/58; B60K 28/16
USPC .......................................................... 701/83
See application file for complete search history.

(56) References Cited

U.S. PATENT DOCUMENTS 5,456,641 A * 10/1995 Sawase ............. B60K 17/3462
                                                      180/197
5,839,799 A * 11/1998 Fukada ............... B60T 8/17552
                                                      303/146

(Continued)

FOREIGN PATENT DOCUMENTS

JP         2008178255          7/2008

OTHER PUBLICATIONS

Predictive tire force saturation management for vehicle stability control by Sill, Justin Harold, Ph.D., Clemson University, 2012, 126 pages; 3512319 A Method and Strategy to Estimate Tire Saturation in Electric and Hybrid Electric Vehicles; Scott Varnhagen and Ming Kuang ; Jun. 16, 2015.

*Primary Examiner* — Muhammad Shafi
(74) *Attorney, Agent, or Firm* — David R. Stevens; Stevens Law Group (57) ABSTRACT

A vehicle and associated method for calculating tire saturation is provided. The method may include the stability control computer calculating slip ratio and longitudinal force for the tire, calculating tire longitudinal stiffness by dividing longitudinal force by slip ratio, calculating tire saturation from tire longitudinal stiffness, and the stability control computer altering dynamic control of the vehicle based on calculated tire saturation. The stability control computer may calculate tire saturation from a tire saturation membership function which includes a first tire longitudinal stiffness value representing an unsaturated tire, a second tire longitudinal stiffness value representing a saturated tire, and a function line connecting the first tire longitudinal stiffness value to the second tire longitudinal stiffness value.

14 Claims, 9 Drawing Sheets

(51) Int. Cl.
  *B60W 10/06*  (2006.01)
  *B60W 10/184*  (2012.01)

(56) References Cited

U.S. PATENT DOCUMENTS

| | | | | |
|---|---|---|---|---|
| 5,927,421 | A * | 7/1999 | Fukada | B60K 28/16 |
| | | | | 180/197 |
| 5,928,302 | A * | 7/1999 | Fukada | B60T 8/1755 |
| | | | | 180/197 |
| 7,908,112 | B2 | 3/2011 | Nardi | |
| 8,498,775 | B2 | 7/2013 | Yngve | |
| 2002/0013652 | A1 * | 1/2002 | Yasui | B60T 8/172 |
| | | | | 701/80 |
| 2005/0012386 | A1 * | 1/2005 | Nakano | B60T 8/172 |
| | | | | 303/114.1 |
| 2008/0109134 | A1 * | 5/2008 | Bolourchi | B62D 6/002 |
| | | | | 701/41 |
| 2008/0183353 | A1 * | 7/2008 | Post | B60G 17/0165 |
| | | | | 701/42 |
| 2008/0262680 | A1 | 10/2008 | Yeh | |
| 2010/0174437 | A1 | 7/2010 | Benedict | |
| 2011/0307129 | A1 * | 12/2011 | Yu | B60K 7/0007 |
| | | | | 701/22 |
| 2013/0226411 | A1 * | 8/2013 | Hirano | B62D 6/00 |
| | | | | 701/42 |
| 2015/0274159 | A1 * | 10/2015 | Lu | B60T 8/171 |
| | | | | 701/82 |
| 2015/0291038 | A1 * | 10/2015 | Akiyama | B60L 3/102 |
| | | | | 701/22 |

* cited by examiner

VEHICLE TIRE SATURATION ESTIMATOR

BACKGROUND

Field of the Invention

This invention relates to vehicular systems and more particularly to systems and methods for estimating vehicle tire saturation and for controlling a vehicle in response to calculated tire saturation.

Background of the Invention

It is desirable to provide greater control over vehicle dynamics. Modern vehicles may be benefitted by providing improved vehicle dynamic control including traction control, anti-lock brakes, etc. Accordingly, what is needed is a system and method for providing improved information about vehicle status to thereby provide improved vehicle dynamic control.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various examples of the present invention. Also, common but well-understood elements that are useful or necessary in a commercially feasible embodiment are often not depicted in order to facilitate a less obstructed view of these various embodiments of the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Figure 1:
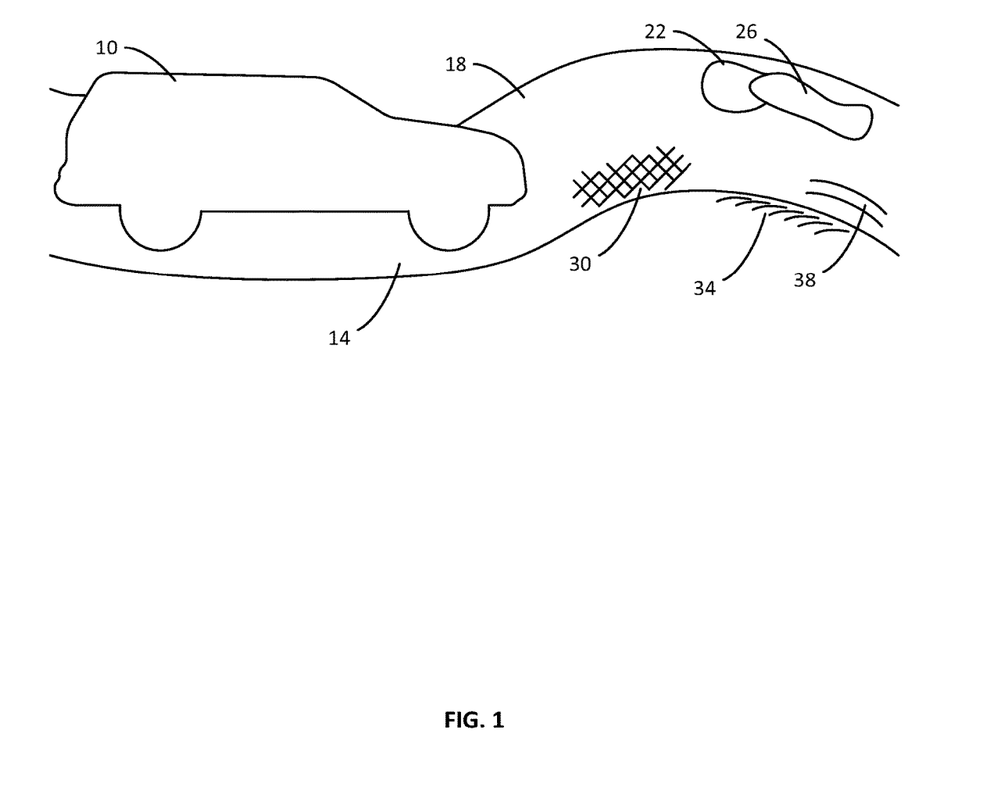
FIG. 1 is a schematic diagram of a vehicle.

Referring to FIG. 1, vehicles driving in the real world are presented with an array of conditions that are ever changing. Changes in applied motor power and braking force may greatly change the amount of load placed on vehicle tires as a vehicle 10 travels over a surface such as a road 14. Additionally, environmental factors such as curves in the road 18, water 22, ice 26, loose debris such as sand 30, changes in surface material such as encountering dirt or a road shoulder 34, and bumps or dips 38 in the road may all change the available tire traction. These varying road conditions may dramatically reduce the frictional forces which may be created by the vehicle tires, causing the applied motor power or breaking forces to overcome the frictional forces which may be generated by the tires. Loss of frictional force from the vehicle tires typically results in wheel slip and may challenge the ability of a driver to maintain control over a vehicle and may cause a loss of vehicle control.

In order to improve driver control over a vehicle 10, a vehicle may be equipped with sensors and computer systems that collectively sense, interpret, and react to the environment surrounding the vehicle and, more particularly, to undesired changes in the operation of the vehicle. In the present discussion, it will be appreciated that a vehicle 10 may refer to a variety of different machines such as automobiles, trucks, vans, busses, etc. and may include electric and internal combustion vehicles as well as hybrid and alternative powertrain vehicles.

Figure 2:
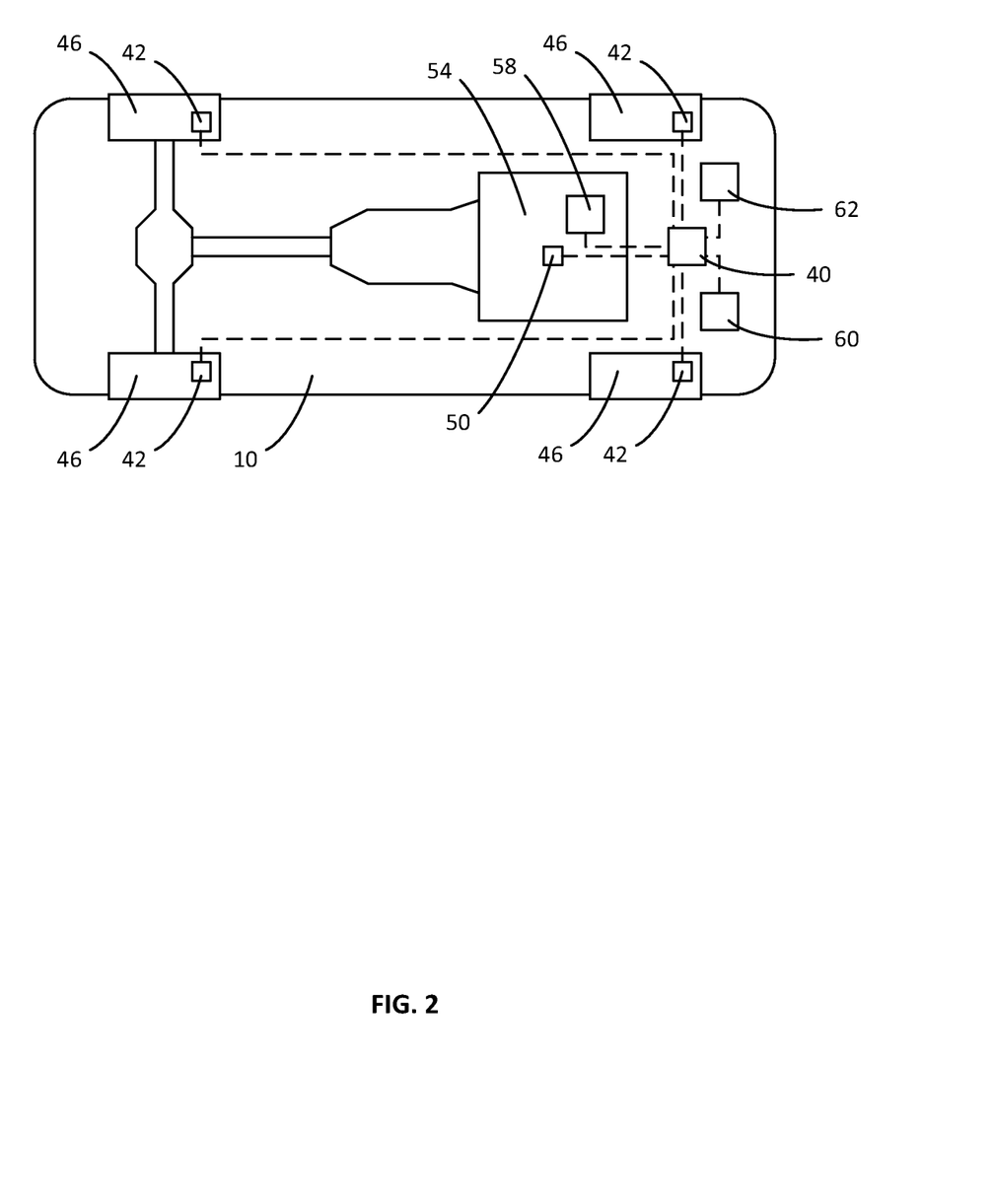
FIG. 2 is another schematic diagram of the vehicle.

As shown in FIG. 2, a vehicle 10 may include a stability control computer 40 which collects vehicle information and which controls vehicle motion such as by implementing vehicle dynamic control, traction control, braking control, etc. The vehicle may include sensors 42 such as wheel rotational sensors which measure the rotational speed of the vehicle wheels 46. The vehicle may include engine sensors 50 which may measure the rotational speed or output power of the vehicle engine 54. These sensors 42, 50 may communicate with the stability control computer 40 and transmit information about the vehicle to the stability control computer.

The stability control computer 40 may also communicate with an engine control computer 58. The engine control computer 58 may provide information such as engine output power and speed to the stability control computer 40. The stability control computer 40 (or in other words, a stability control module 40) may communicate with another vehicle computer 60 or computer module as necessary. The stability control computer may also communicate with a vehicle braking module 62, such as an electrically operated antilock braking module which operates the vehicle brakes. The stability control computer 40 may change the operation of the braking module 62 in order to increase the stability of the vehicle. The stability control computer 40 may also include other sensors or components such as an accelerometer as may be necessary. The many different road conditions and situations that a vehicle may encounter during operation create significant challenges for using a stability control computer 40 to implement vehicle-based dynamic control systems such as stability control, traction control, anti-lock brake control, etc.

It will be appreciated that, while various electronic components of the vehicle 10 such as computers, control modules, sensors, etc. are illustrated as separate components, various features may be implemented by a single computer or module. Similarly, the functionality described with respect to a single computer, module, sensor, etc. may be distributed across multiple separate components as is convenient for the manufacture of vehicles.

In selected embodiments, a stability control computer 40 may include computer hardware and computer software. The computer hardware may include one or more processors, memory, a user interface, other hardware or a combination or sub-combination thereof. The memory may be operably connected to the one or more processors and store the computer software. This may enable the one or more processors to execute the computer software.

A user interface may enable an engineer, technician, or the like to interact with, run, customize, or control various aspects of a stability control computer 40. In selected embodiments, a user interface may include one or more keypads, keyboards, touch screens, pointing devices, or the like or a combination or sub-combination thereof.

In selected embodiments, the memory of a stability control computer 40 may store one or more vehicle models, one or more sensor models, one or more tire force, tire slip ratio, and tire stiffness calculation models, one or more tire saturation membership models, other data or software, or the like or combinations or sub-combinations thereof.

Figure 3:
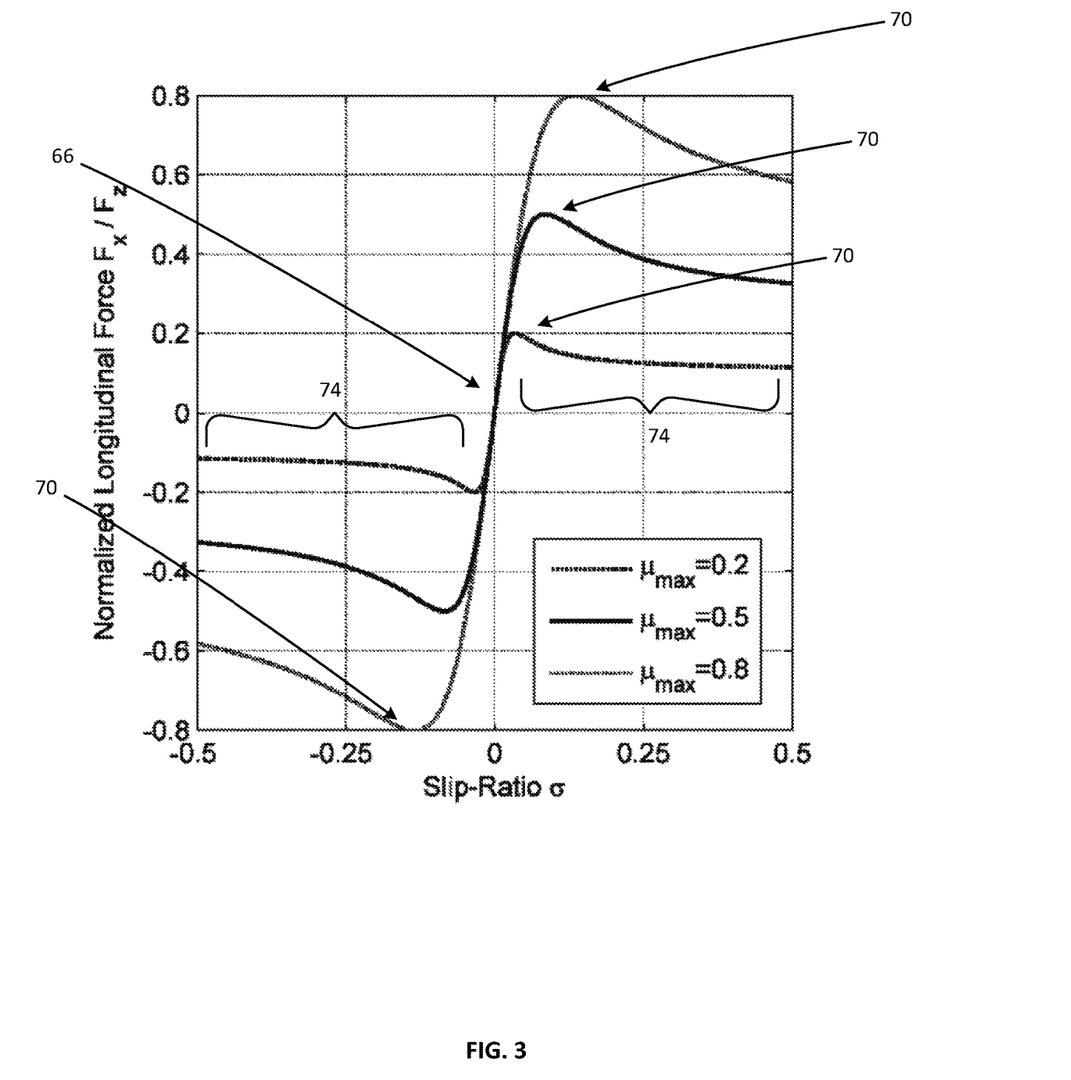
FIG. 3 is a chart illustrating tire force versus slip ratio.

The most significant forces contributing to the acceleration and braking of a vehicle are generated by its tires. As tires are elastomeric, there is a strong correlation between the amount of longitudinal (or lateral) force generated by a tire and its deformation in the longitudinal direction. A tire's longitudinal deformation is characterized by its slip ratio. The tire slip ratio is the normalized difference between the wheel center longitudinal velocity and the tire's longitudinal velocity. FIG. 3 presents a model of the constitutive relationship by which tires generate longitudinal force with respect to slip ratio. For simplicity, the longitudinal forces of the tire are discussed herein as an illustrative example. It will be appreciated, however, that these calculations may also be performed with respect to the lateral forces of the tire and, in a general case, the calculations may be performed for the traction/frictional force between the tire and the road surface in contact with the tire. Thus, the longitudinal force and slip may be discussed herein as exemplary of the tire traction force.

For illustrative purposes, FIG. 3 presents a graph of normalized longitudinal force vs. slip ratio for a hypothetical tire operating on three different road surfaces with three different corresponding coefficients of friction. The road surface with the highest coefficient of friction ($\mu_{max}$=0.8) generates the curve with the largest peak magnitudes of normalized positive and negative forces (0.8 and −0.8). The road surface with the intermediate coefficient of friction ($\mu_{max}$=0.5) generates the intermediate curve with the magnitudes of positive and negative forces of 0.5 and −0.5. The road surface with the lowest coefficient of friction ($\mu_{max}$=0.2) generates the curve with the lowest peak magnitude of positive and negative forces having a magnitude of 0.2 and −0.2.

The tire generates force in approximately linear proportion to slip ratio for all three road surfaces when operating at relatively small slip ratios, as indicated by the central linear region 66 of the force curves. However, as slip ratio increases beyond this (central) linear region 66 the tire begins to progressively slide on the road surface. This sliding is shown by increases in slip ratio beyond moderately small values on the graph. As slip ratio increases, force generation from the tire saturates. This is evidenced by the force peaks 70 for each tire force curve and the subsequent reduction in force values in the saturated region 74 of the force curve. Saturation of the tire results in little or no additional force generation or even a reduction in force generation with increasing slip ratio. This saturation occurs earlier (at lower values of slip ratio) for tires operating on lower friction surfaces. As described herein, tires operating near the linear region of force generation will be considered unsaturated and tires operating beyond this region (e.g. in saturation region 74 on FIG. 3) will be considered saturated.

It is desirable to avoid tire saturation for several reasons. Tire saturation reduces the tire's capacity to generate both longitudinal and lateral force; i.e. acceleration/braking and turning force. It is seen from the chart in FIG. 3 that the force generated by a saturated tire is typically less than the peak force which may be generated by the tire. A loss in force generation capacity means that a driver may not be able to brake, accelerate, or turn a vehicle as desired. Tire saturation may also prematurely degrade tire life. Tire life is degraded because a saturated tire will experience significantly more slip than an unsaturated tire producing the same amount of force. That is to say that a saturated tire will slide across the road surface significantly more than an unsaturated tire producing the same amount of force.

The present system utilizes an estimate of both the tire's deflection (slip ratio) as well as the tire's longitudinal/lateral force generation to produce an estimate of the saturation state of the tire. The improved estimate of the saturation state of the tire may be used by the vehicle stability control systems to improve vehicle handling and avoid saturation of vehicle tires.

Estimation of slip ratio can be achieved utilizing production equipment such as wheel speed sensors and the on board Inertial Measurement Unit (IMU). A vehicle IMU may be part of a vehicle computer 60 or a separate vehicle electronics module. The IMU may include, for example, a three axis accelerometer and a 3 axis gyroscope as well as a processor and other supporting electronics. The IMU may be used to independently determine vehicle position and velocity. The IMU may integrate acceleration over time to determine velocity and may further integrate velocity over time to determine position, if desired. As such, the IMU may be used to determine the current velocity of a vehicle. Alternatively, a vehicle GPS module may be included as part of a vehicle computer 60 or as a separate module. The GPS module may be used to determine velocity of a vehicle by deriving positional information with respect to time.

The stability control computer 40 may use vehicle velocity information to determine the slip ratio of the vehicle tires. For example, the vehicle velocity information obtained from the vehicle IMU module or from a vehicle GPS module may be compared to information from vehicle wheel sensors 42 to determine slip. Wheel sensors 42 may provide wheel rotational speed to the stability control computer 40. From the wheel rotational speed, the stability control computer 40 may determine a theoretical speed of the vehicle based on tire circumference and rotational speed. The slip ratio may be determined from the calculated theoretical speed from the wheel sensor data and the actual vehicle speed. If the actual speed ($V_a$) is 40 km/hr and the theoretical speed ($V_t$) is 40.1 km/hr, the slip ratio $\sigma=(V_t/V_a-1)=(40.1/40-1)=0.025$.

In contrast, estimation of longitudinal tire force generation $F_x$ is difficult to discern on a conventional automobile. However, such an estimate is available for tires whereupon the wheel torque input by the propulsion/braking system is approximately known. Examples of such architectures include wheel motored vehicles or vehicles where an electric machine drives two wheels via an open differential.

For various different vehicle platforms, the longitudinal tire force generation may be calculated from the input torque or power (and thereby torque). In an electrically driven vehicle, the input power may be calculated by the electrical voltage applied to the drive motor and the current consumed by the motor and the known efficiency or torque curve of the motor. In a vehicle driven by a combustion engine, the engine power may be determined from the fuel consumption and the brake specific fuel consumption of the engine and the engine torque may be determined from the engine power. The fuel consumption may be determined from the current fuel injector pulse width as obtained from the engine control unit (ECU) 58. The ECU 58 or the stability control computer 40 may include a table of engine power or engine torque as a function of injector pulse width versus rpm, intake manifold absolute pressure versus rpm, etc.

Where a vehicle propulsion motor (referring to both motors and engines) drives a wheel directly, the motor torque is approximately the wheel torque. Where a drive train such as a transmission and differential is involved, the motor torque may be reduced by the drivetrain efficiency and the torque may be appropriately divided among the driven vehicle wheels. For example, a motor may produce approximately 300 N*m of torque under given operating conditions. The vehicle drivetrain may be approximately 87% efficient at transmitting torque, resulting in approximately 261 N*m applied to the wheels. If an open differential is used to apply the power to two wheels, each wheel may be driven with approximately 130.5 N*m of torque. If the wheel diameter is 0.65 meters, the wheel may apply a force of approximately 401.5 N of force at the tire contact patch. For vehicles with more complicated drivetrains involving limited slip or torque managing differentials, etc., the drivetrain efficiency and power delivery may be known for these individual components and used to calculate the torque applied to each driven wheel and the resultant force $F_x$ at the tire contact patch.

The force at the contact patch at each wheel during braking may be determined from the braking torque. Braking torque may be determined from the brake fluid hydraulic pressure applied to each wheel brake and known qualities of the brake system such as the brake piston area, leverage arm, and brake pad material properties. The vehicle braking module 62 may include pressure sensors in each braking circuit to measure the fluid pressure applied to each wheel brake. The stability control computer 40 may include a chart of braking torque for each wheel based on brake fluid pressure and thereby calculate the force at the tire contact patch.

In some situations, the force $F_x$ at each tire contact patch may be calculated from the inertial measurement unit and known vehicle parameters. For example, the IMU may be used to determine the longitudinal and lateral vehicle acceleration, rotation, etc. and may be used to calculate the approximate force $F_x$ at each wheel based on vehicle weight and other factors such as suspension design and loading, etc.

Tire longitudinal stiffness may be used as an improved indication of tire saturation. Tire longitudinal stiffness $C_x$ may be defined as:

$$C_x=F_x/\sigma.$$

Tire longitudinal stiffness is herein defined as tire longitudinal force generation ($F_x$) divided by the tire slip ratio ($\sigma$).

Figure 4:
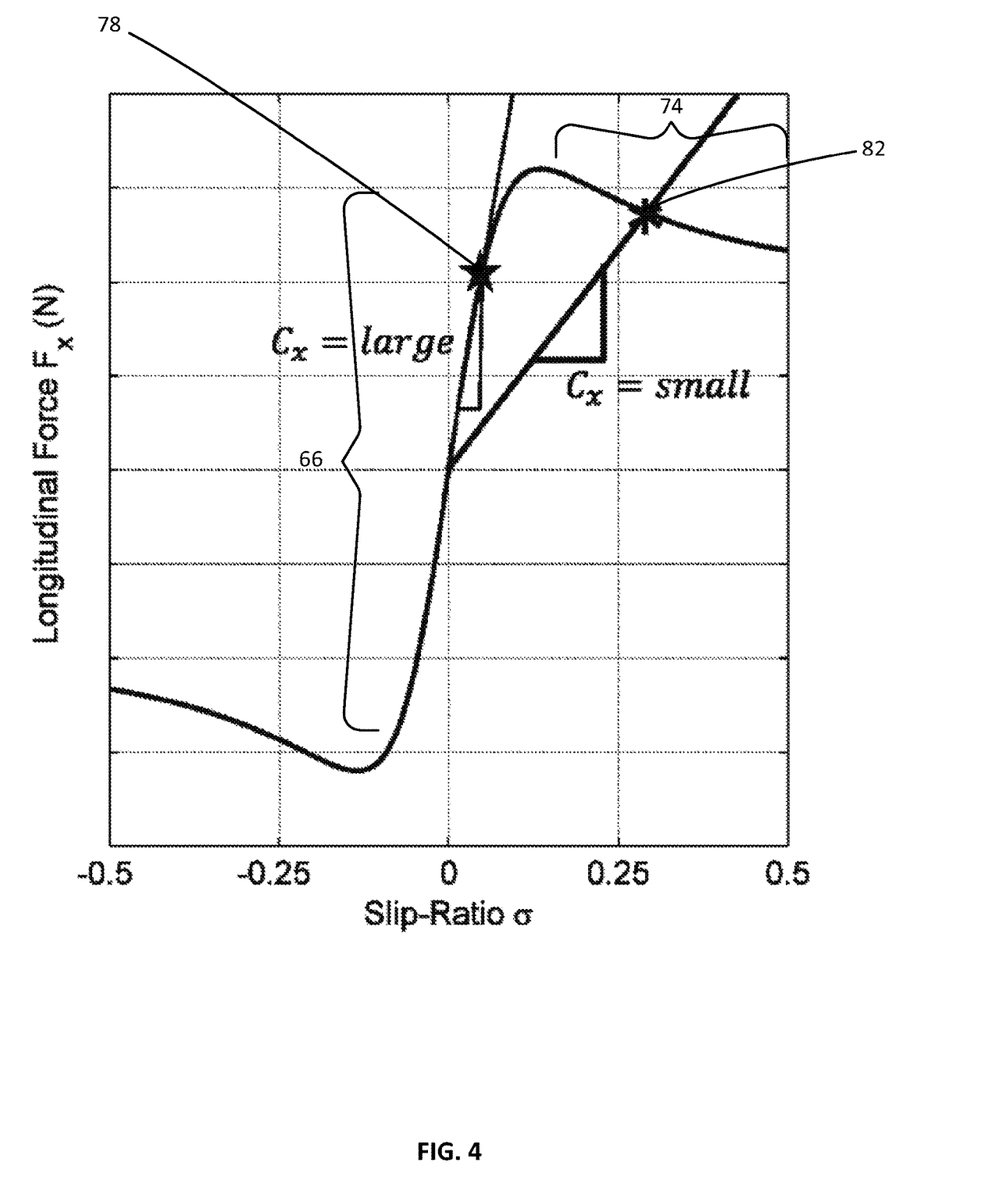
FIG. 4 is a chart illustrating longitudinal stiffness on a tire force versus slip ratio curve.

FIG. 4 shows a graph of longitudinal tire force versus slip ratio for a tire. As with the graph in FIG. 3, the center of the graph represents zero tire force and zero tire slip ratio. A vehicle tire on a vehicle in motion may be represented as a point on the force/slip ratio curve. Point 78 indicates a tire which is unsaturated and point 82 represents a tire which is saturated. For each tire condition (e.g. point 78 or point 82) the vertical distance between the point and the graph origin is the tire force $F_x$ and the horizontal distance between the point and the graph origin is the tire slip ratio G. Accordingly, the tire stiffness $C_x$ is the slope of a line connecting the graph origin and the point representing the tire operational condition (e.g. point 78 or point 82 or another point on the force/slip ratio curve). As is evident from FIG. 4, tire longitudinal stiffness $C_x$ will be at its largest when tires operate near their central, linear region 66 and will monotonically decrease as tires operate farther away from this linear region 66 in a saturated region 74.

As the estimation of slip ratio and longitudinal tire force can be relatively noisy it is important to require adequately large signals when calculating longitudinal stiffness to ensure an acceptable signal-to-noise ratio. This feature is incorporated in the estimation routine mentioned shortly.

Figure 5:
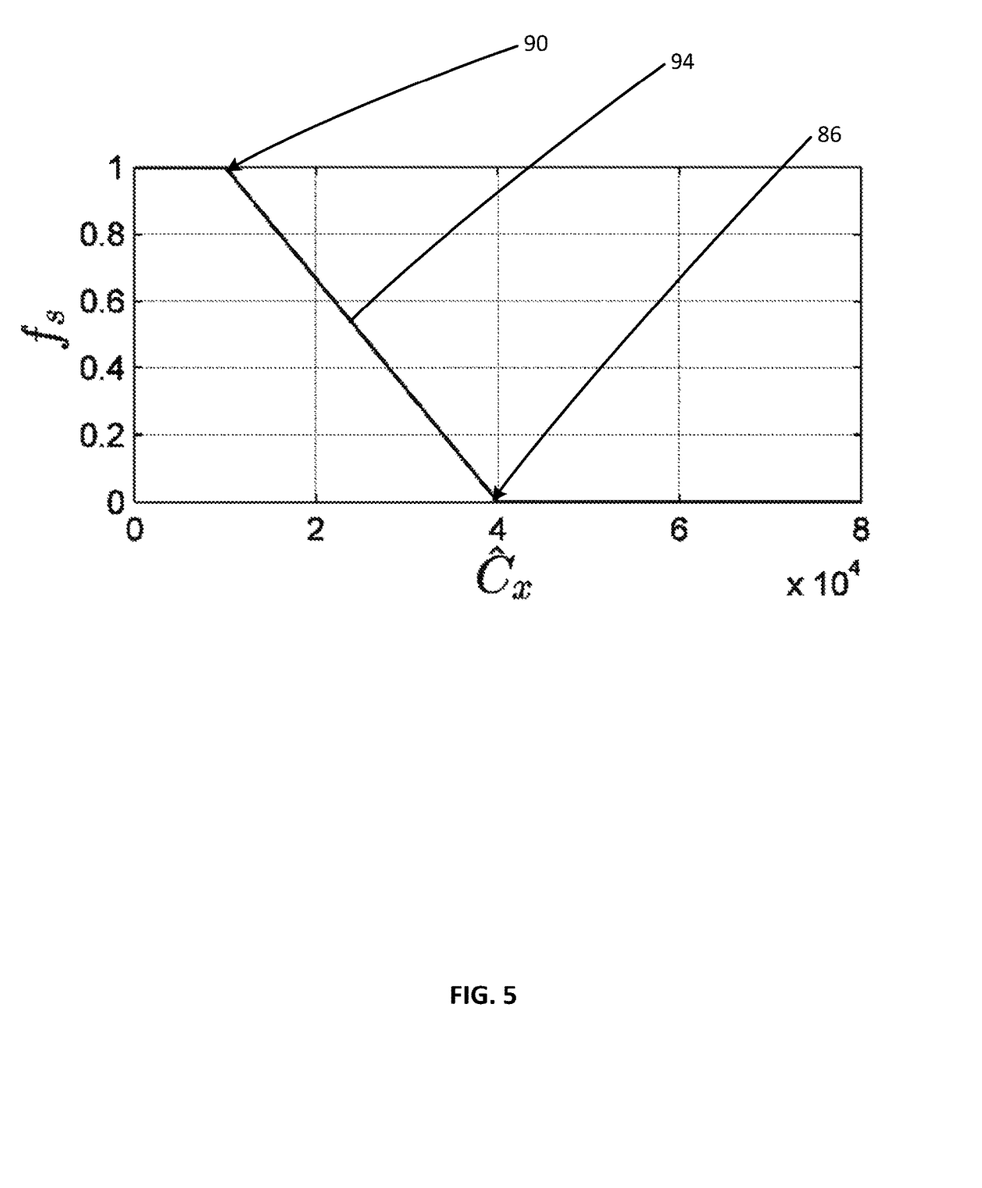
FIG. 5 is a chart illustrating an example tire saturation member function.

FIGS. 3 and 4 illustrate force versus deflection curves for hypothetical tires. However, these curves are indeterminate for real tires operating in real world conditions. This is because the frictional coefficient of the road surface, etc. is not precisely known. Instead of knowing exactly where the tire lies upon this curve, it can only be said that a tire operating with a larger longitudinal stiffness is likely less saturated than a tire operating with a lower longitudinal stiffness. Accordingly, a tire saturation membership function may be used to transform estimates of longitudinal stiffness into estimates of tire saturation. An example membership function is shown in FIG. 5 where $f_s$ is a metric of tire saturation with $f_s=0$ corresponding to an unsaturated tire and $f_s=1$ corresponding to a fully saturated tire.

For the example membership function, any tire stiffness $C_x$ equal to point 86 (the numerical value 4 or greater) or greater represents an unsaturated tire, stiffness values between point 86 and point 90 (between numerical values of 4 and 1) indicate a tire transitioning towards saturation, and stiffness values equal to point 90 or less (the numerical value of 1 or less) represent a saturated tire with a line 94 connecting points 86 and 90 to define the transition between unsaturated and saturated tire conditions.

A vehicle calibration engineer may shape this membership function to achieve the desired tire saturation estimator performance. Shaping the membership function may allow the engineer to select a desired vehicle performance in terms of how much tire slip is desirable before a vehicle stability control computer 40 determines that the tires are saturated and implements vehicle dynamic control strategies through vehicle systems such as traction control or anti-lock braking. When the vehicle stability control computer 40 determines that a tire is saturated, it may modify the vehicle operation by reducing engine power, changing vehicle power distribution through active differentials, engaging one or more wheel brakes, etc. The stability control computer 40 may implement varying degrees of stability control outputs according to the tire stiffness/tire saturation membership function. Accordingly, a stability control computer may make subtle changes to vehicle operation when a vehicle tire becomes moderately saturated (i.e. $f_s$ values greater than 0 and less than 1) and may implement progressively stronger changes to vehicle operation as $f_s$ approaches 1.

Figure 6:
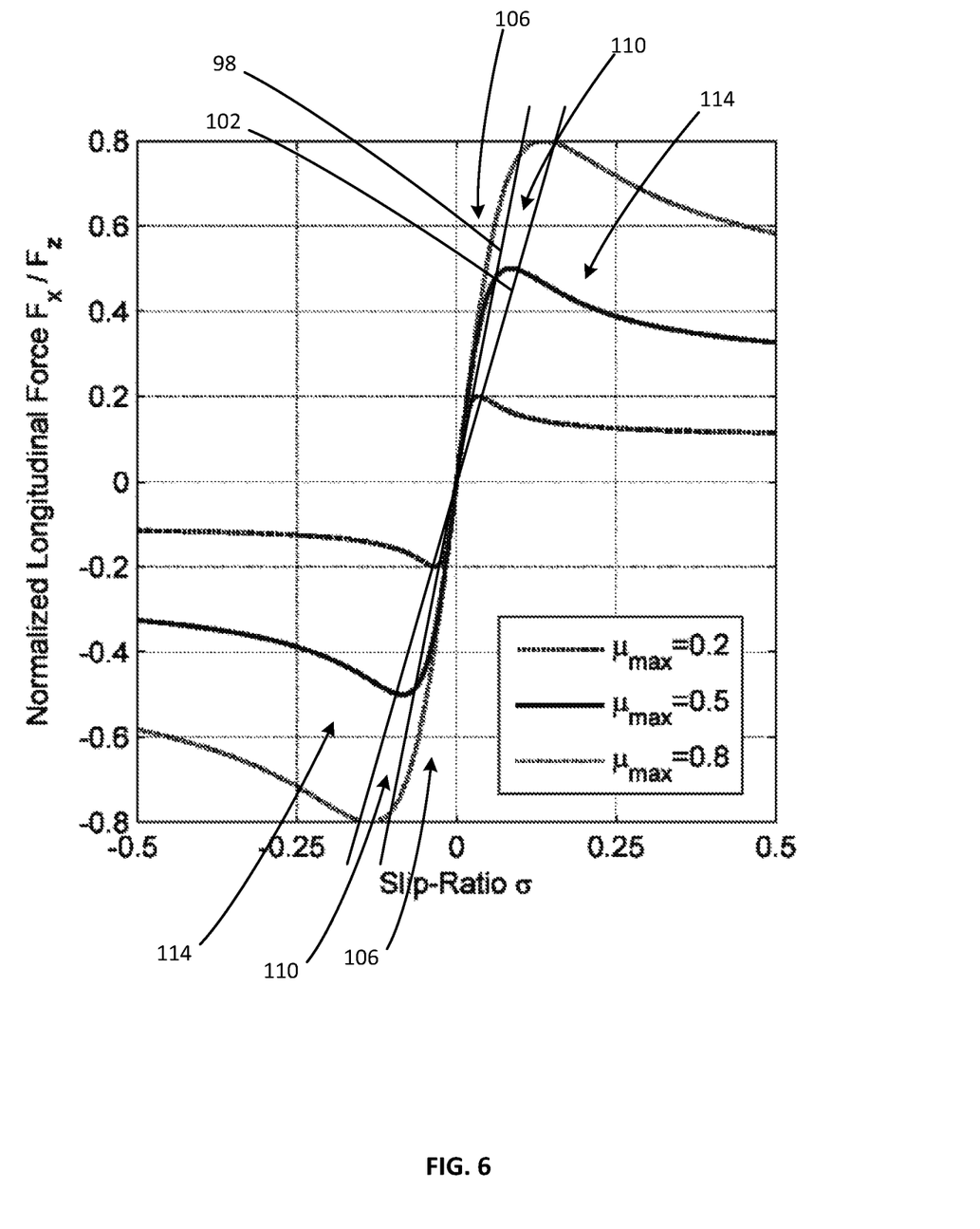
FIG. 6 is a chart illustrating a determination of tire saturation on a tire force versus slip ratio curve.

As is illustrated in FIG. 6, the tire saturation membership function $f_s$ allows an engineer to select tire saturation value $C_x$ for unsaturated tires represented by sloped line 98 and a tire saturation value $C_x$ for saturated tires represented by sloped line 102. The slope of line 98 corresponds to the value of point 86 and the slope of line 102 corresponds to the value of point 90. The tire force/slip ratio graph is thus divided into three areas of tire saturation; an area 106 representing unsaturated tires located between the vertical graph axis and line 98, an area 110 of tires transitioning between unsaturation and saturation located between line 98 and line 102, and an area 114 representing saturated tires which is located between line 102 and the horizontal axis of the graph.

Using a single value of $C_x$ to differentiate between unsaturated tires and saturated tires would provide two areas of tire saturation on the force-slip ratio graph. The graph would include a first area representing unsaturated tires which is located between the vertical graph axis and line with a slope of the selected value of $C_x$ and a second area representing saturated tires which is located between the line of slope Cx and the horizontal axis of the graph.

This method of determining tire stiffness $C_x$ as a measure of tire saturation provides improved estimation of tire saturation for different road surfaces with different coefficients of friction. As can be seen from FIG. 6, the unsaturated area 106 corresponds well with unsaturated tires across the different example road surfaces/coefficients of friction. Similarly, the transitional saturation area 110 and the saturated area 114 correspond well with the tire condition for the different road surfaces.

In contrast, estimating tire saturation based only on slip ratio leads to unsatisfactory results. Selecting a tire saturation cutoff of σ=0.04 adequately represents tire saturation on slippery roads (coefficient of friction=0.2) but will result in vehicle stability control systems limiting available tire force for dry roads (coefficient of friction=0.8). A tire saturation cutoff of σ=0.125 selected for performance on dry roads will allow excessive wheel spin and a significant loss of traction on slippery roads.

Figure 7:
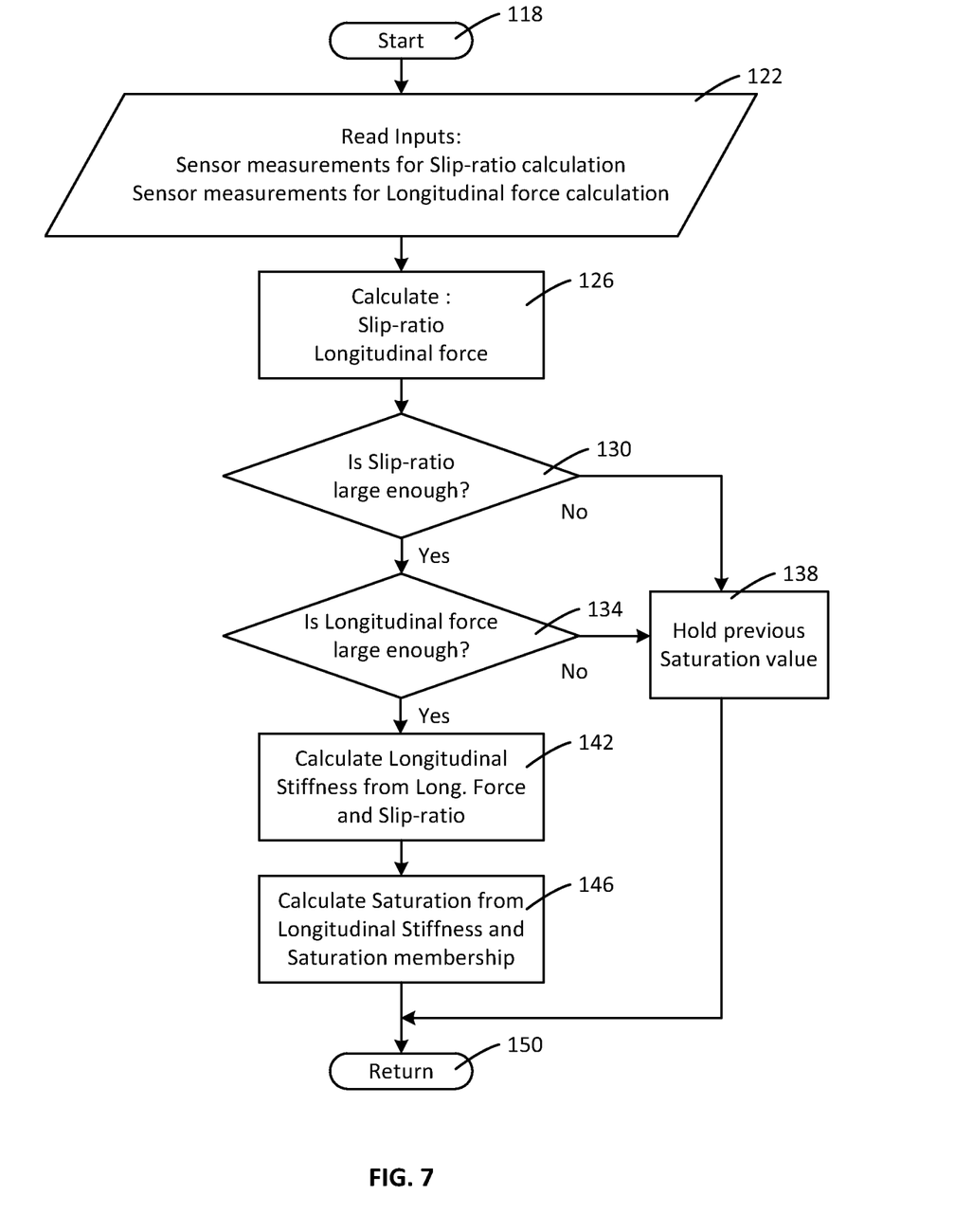
FIG. 7 is a flowchart illustrating the determination of tire saturation.

FIG. 7 illustrates a flowchart for determining and updating tire saturation based on tire stiffness $C_x$. As illustrated, a vehicle stability control computer 40 may start 118 a routine for determining tire saturation based on tire stiffness $C_x$. The stability control computer 40 may read 122 inputs from a vehicle 10 including inputs from vehicle sensors, vehicle GPS, vehicle IMU, etc. The stability control computer 40 may then calculate 126 a tire slip ratio σ and a tire longitudinal force $F_x$. It will be appreciated that the longitudinal force refers to a force between the tire and the road surface and the direction of the force may or may not align with the centerline of the vehicle, such as during turning where a significant lateral force component may be present.

The stability control computer 40 may then determine 130 if the calculated slip ratio is large enough to be a valid or usable value and may also determine 134 if the calculated longitudinal force is large enough to be a valid or usable value. If not, the stability control computer 40 may hold 138 a previously calculated tire saturation metric. If the calculated slip ratio and longitudinal force are large enough, the stability control computer 40 may calculate 142 tire longitudinal stiffness from the slip ratio and longitudinal force. The stability control computer 40 may then calculate 146 a tire saturation metric from the tire longitudinal stiffness. In particular, the computer 40 may calculate tire saturation metric from tire longitudinal stiffness based on a tire saturation membership function. The stability control computer 40 may then return 150 to the start.

The flowchart in FIG. 7 illustrates the architecture, functionality, and operation of a possible implementation of a system, method, and computer program product according to one embodiment of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

As discussed, the tire saturation metric is used by the stability control computer 40 to modify vehicle operational parameters and maintain tire traction and vehicle control. In one example, the stability control computer 40 may alter the output of the braking module 62 to reduce sliding during braking such as by increasing or decreasing the braking torque provided to various vehicle wheels. The braking module 62 may use electrically operated hydraulic pumps to altering the brake fluid pressure which is delivered to the various vehicle wheels. In another example, the stability control module may alter the output of the engine 54 to reduce wheel spin during acceleration or driving by altering engine throttle position, spark timing, etc. In another example, the stability control module may alter the operation of drivetrain components to alter the torque applied to different wheels. For example, the stability control module may alter the function of torque controlled differentials to change the power distribution and reduce wheel spin at particular wheels. The stability control module may alter the output of the braking module 62, engine 54, or drivetrain components in combination to maintain tire traction and vehicle control. These may all be referred to generally as altering the torque which is applied to the vehicle wheel(s). The stability control module may increase the torque applied to one or more wheels or reduce the torque applied to one or more wheels to maintain tire traction and vehicle control.

Figure 8:
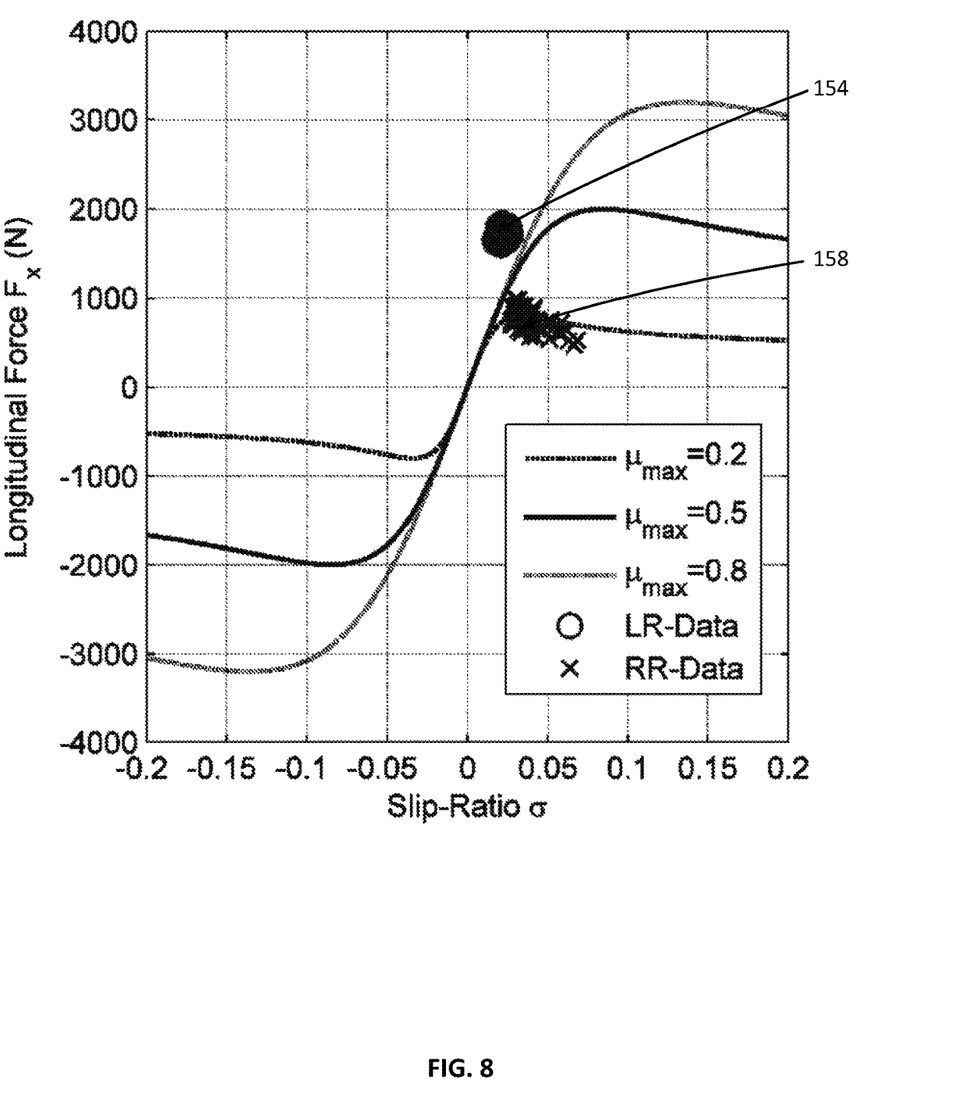
FIG. 8 is an illustration of tire force and slip ratio data points overlaid on a chart illustrating tire force versus slip ratio.
Figure 9:
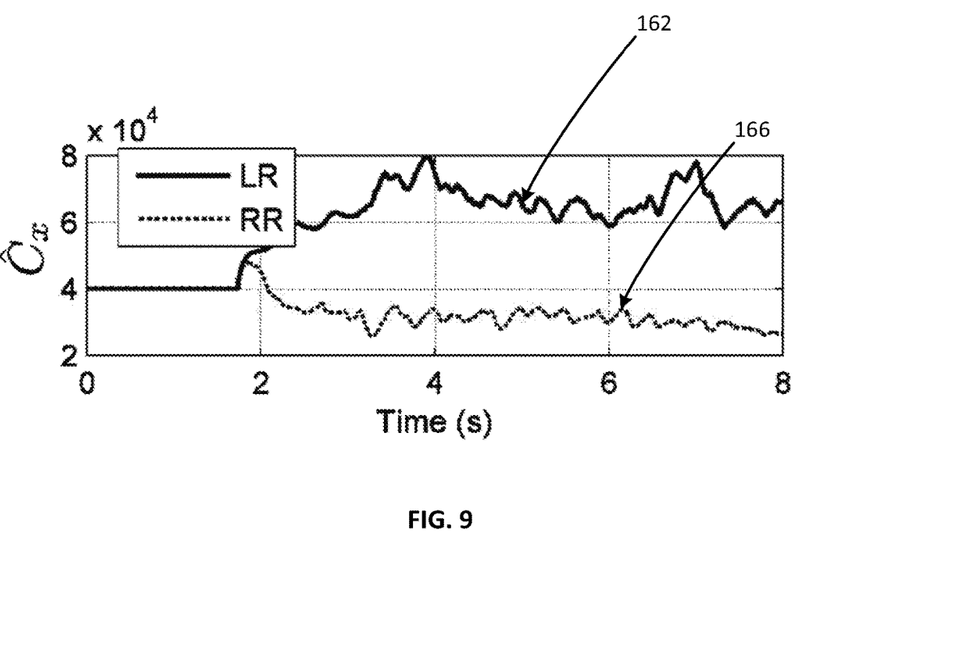
FIG. 9 is a chart illustrating experimental data of tire stiffness.
Figure 10:
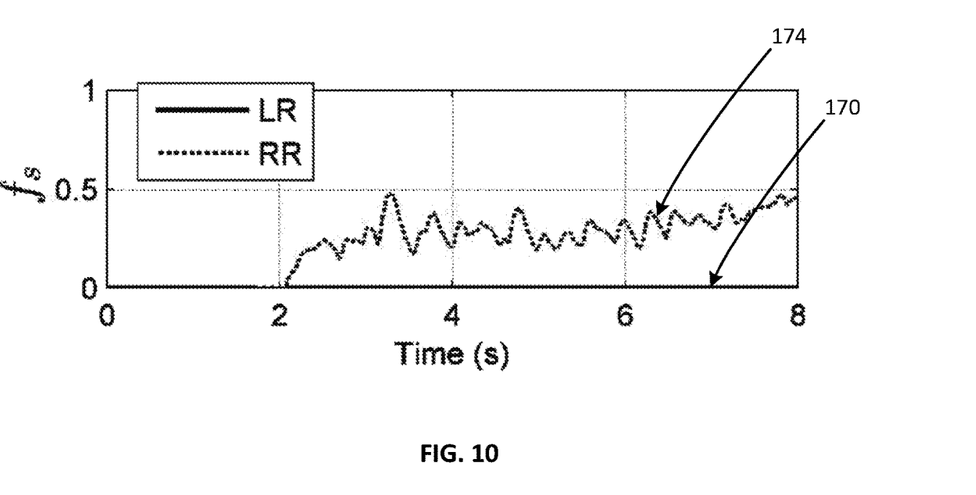
FIG. 10 is a chart illustrating tire saturation for the experimental data of tire stiffness.

Experimentation was conducted on a vehicle with two electric wheel motors, one driving each rear wheel of the vehicle. FIGS. 8, 9 and 10 present the results of an aggressive launch from rest where the Left Rear (LR) tire of the vehicle was on dry pavement while the Right Rear (RR) tire of the vehicle was on a slippery surface with a coefficient of friction approximately equivalent to that of an icy road. FIG. 8 shows a portion of the slip ratio versus longitudinal force data recorded from each rear tire. The data from the Left Rear tire is indicated at 154 while the data from the Right Rear tire is indicated at 158. From the figure, it is evident that the RR tire has become saturated while the LR tire is unsaturated and exhibits near linear operation.

FIG. 9 shows the estimated longitudinal stiffness $C_x$ from the LR tire (at 162) and the RR tire (at 166). FIG. 10 shows the result of the FIG. 5 tire saturation membership for each rear tire (the LR tire at 170 and the RR tire at 174) as produced by the routine described in FIG. 7. As is evident in the figure, the RR tire operating on the slippery surface is estimated to be moderately saturated based on the membership function provided in FIG. 5. In contrast, the LR tire operating on the dry pavement is estimated to be unsaturated. This information is easily leveraged by higher level control algorithms in the stability control computer 40 to better avoid tire saturation, and thus improve tire force generation and reduce tire wear.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A vehicle stability control system comprising:
a vehicle having a tire;
a stability control computer mounted in the vehicle, the stability control computer programmed to:
calculate a slip ratio for the vehicle tire;
calculate a traction force applied to a road surface by the tire;
calculate tire stiffness for the tire by dividing the traction force by the slip ratio;
calculate tire saturation from tire stiffness and a tire saturation membership function;
wherein the tire saturation membership function includes a first tire stiffness value representing an unsaturated tire, a second tire stiffness value representing a saturated tire, and a function line connecting the first tire stiffness value to the second tire stiffness value;
make changes to vehicle operation when the tire saturation is greater than 0 and less than 1 such that a magnitude of the changes becomes progressively stronger as the tire saturation approaches 1, the making changes including implementing varying degrees of stability control outputs according to the tire saturation membership function; and
when the tire saturation indicates that the vehicle tire is saturated, modifying the vehicle operation by at least one of reducing engine power, change vehicle power distribution through active differentials, engaging one or more wheel brakes effective to provide improved vehicle dynamic control.

2. The vehicle of claim 1, wherein the stability control computer is configured to calculate slip ratio for the tire by comparing vehicle actual speed with tire rotational speed and tire circumference.

3. The vehicle of claim 2, wherein the stability control computer is configured to calculate vehicle actual speed from sensor data from a vehicle inertial measurement unit.

4. The vehicle of claim 1, wherein the stability control computer is configured to calculate tire longitudinal force from engine output torque and vehicle driveline characteristics.

5. The vehicle of claim 1, wherein the tire saturation membership function includes a first tire longitudinal stiffness value representing an unsaturated tire, a second tire longitudinal stiffness value representing a saturated tire, and a function line connecting the first tire longitudinal stiffness value to the second tire longitudinal stiffness value.

6. The vehicle of claim 5, wherein the stability control computer is configured to:
identify a tire with a tire longitudinal stiffness greater than or equal to the first tire longitudinal stiffness value as unsaturated;
identify a tire with a tire longitudinal stiffness less than or equal to the second tire longitudinal stiffness value as saturated; and
identify a tire with a tire longitudinal stiffness between the first tire longitudinal stiffness value and the second tire stiffness value as partially saturated according to the function line.

7. The vehicle of claim 1, wherein the stability control computer is configured to alter power distribution between two or more vehicle tires to alter the torque applied to the tire.

8. A method for operating a vehicle stability control system of a vehicle having a tire and a vehicle stability control computer mounted in the vehicle, the stability control computer performing the steps of:
calculating a slip ratio for the vehicle tire;
calculating a traction force applied to a road surface by the tire;
calculating tire stiffness for the tire by dividing the traction force by the slip ratio;
calculating tire saturation from tire stiffness and a tire saturation membership function;
wherein the tire saturation membership function includes a first tire stiffness value representing an unsaturated tire, a second tire stiffness value representing a saturated tire, and a function line connecting the first tire stiffness value to the second tire stiffness value;
making changes to vehicle operation when the tire saturation is greater than 0 and less than 1 such that a magnitude of the changes becomes progressively stronger as the tire saturation approaches 1, the making changes including implementing varying degrees of stability control outputs according to the tire saturation membership function; and
when the tire saturation indicates that the vehicle tire is saturated , modifying the vehicle operation by at least one of reducing engine power, changing vehicle power distribution through active differentials, engaging one or more wheel brakes effective to provide improved vehicle dynamic control.

9. The method of claim 8, wherein the method comprises:
the vehicle stability control computer calculating a slip ratio for a vehicle tire;
the vehicle stability control computer calculating a traction force applied to a road surface by the tire;
the vehicle stability control computer calculating tire stiffness for the tire by dividing the traction force by the slip ratio; and
the vehicle stability control computer calculating tire saturation from the tire stiffness.

10. The method of claim 9, wherein the method comprises the vehicle stability control computer calculating a slip ratio for the tire by comparing vehicle actual speed with tire rotational speed and tire circumference.

11. The method of claim 10, wherein the method comprises the vehicle stability control computer calculating vehicle actual speed from sensor data from a vehicle inertial measurement unit.

12. The method of claim 9, wherein the method comprises the vehicle stability control computer calculating tire traction force from engine output torque and vehicle driveline characteristics.

13. The method of claim 9, wherein the method comprises the vehicle stability control computer identifying a tire with a tire stiffness greater than or equal to the first tire stiffness value as unsaturated, the vehicle stability control computer identifying a tire with a tire stiffness less than or equal to the second tire stiffness value as saturated, and the vehicle stability control computer identifying a tire with a tire stiffness between the first tire stiffness value and the second tire stiffness value as partially saturated according to the function line.

14. The method of claim 8, wherein the method comprises the stability control computer altering vehicle drivetrain components to alter power distribution between two or more vehicle tires to alter the torque which is applied to the vehicle tire.

* * * * *